United States Patent
Mohrschladt et al.

(10) Patent No.: US 6,362,307 B1
(45) Date of Patent: Mar. 26, 2002

(54) METHOD FOR PRODUCING POLYAMIDES FROM AMINO CARBOXYLIC ACID COMPOUNDS

(75) Inventors: Ralf Mohrschladt, Schwetzingen; Volker Hildebrandt, Mannheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,337

(22) PCT Filed: Feb. 23, 1999

(86) PCT No.: PCT/EP99/01169

§ 371 Date: Aug. 16, 2000

§ 102(e) Date: Aug. 16, 2000

(87) PCT Pub. No.: WO99/43734

PCT Pub. Date: Sep. 2, 1999

(30) Foreign Application Priority Data

Feb. 27, 1998 (DE) .......................................... 198 08 490

(51) Int. Cl.[7] ............................................... C08G 69/00
(52) U.S. Cl. ....................... 528/310; 528/312; 528/328; 528/332; 528/335; 528/336
(58) Field of Search .................. 528/328, 310, 528/312, 335, 336, 332

(56) References Cited

U.S. PATENT DOCUMENTS

| | | | |
|---|---|---|---|
| 2,245,129 A | 6/1941 | Greenewalt | 528/310 |
| 4,568,736 A | 2/1986 | Curatolo | 528/323 |
| 5,646,277 A | 7/1997 | Fuchs | 540/539 |
| 5,874,575 A | 2/1999 | Fuchs | 540/539 |
| 6,248,861 B1 * | 6/2001 | Ng | 528/310 |

FOREIGN PATENT DOCUMENTS

| | | |
|---|---|---|
| DE | 35 34 817 | 4/1987 |
| DE | 43 39 648 | 5/1995 |
| DE | 44 43 125 | 6/1996 |
| WO | 98/08889 | 3/1998 |

* cited by examiner

Primary Examiner—P. Hampton-Hightower
(74) Attorney, Agent, or Firm—Keil & Weinkauf

(57) ABSTRACT

Polyamides are produced by reacting aminocarboxylic acid compounds of the general formula I $$H_2N-(CH_2)_m-COR^1 \qquad (I)$$

where $R^1$ is OH, O—$C_{1-12}$-alkyl or $NR^2R^3$, where $R^2$ and $R^3$ are independently hydrogen, $C_{1-12}$-alkyl or $C_{5-8}$-cycloalkyl, and m is an integer from 3 to 12, optionally in a mixture with aminonitriles and their hydrolysis products and optionally in the presence of water, in a liquid phase at elevated pressure and elevated temperature in the presence of metal oxides as heterogeneous catalysts, the metal oxides being used in a form which permits mechanical removal from the reaction mixture and being removed from the reaction mixture during or after the polymerization.

11 Claims, No Drawings

METHOD FOR PRODUCING POLYAMIDES FROM AMINO CARBOXYLIC ACID COMPOUNDS

BACKGROUND OF THE INVENTION

This invention relates to processes for producing polyamides from aminocarboxylic acid compounds, to the polyamides obtained and to the use thereof.

Polyamides can be produced not only from caprolactam but also, inter alia, from aminocapronitrile.

U.S. Pat. No. 2,245,129 describes a batchwise two-stage preparation of polycaprolactam from aminocapronitrile ("ACN"), and water at a temperature within the range from 150 to 300° C., governed by a specific temperature program as a function of the amount of water added, and a pressure of not more than 30 bar. The disadvantages of this process are the long reaction times (20 h in the first stage), the low viscosity of the resulting polycaprolactam and the high level of volatile bases (essentially primary acid amides) compared with a polycaprolactam produced from caprolactam.

U.S. Pat. No. 4,568,736 partly solves the problems described in U.S. Pat. No. 2,245,129 by the use of phosphorus- and sulphur-containing catalysts. The use of these catalysts improves the low space-time yield of the process described in U.S. Pat. No. 2,245,129. However, the level of volatile bases in all the products produced by this process is still too high, so that the polyamides are difficult to process and have a reduced carboxyl end group number. The stoichiometric discrepancy between the amino and carboxyl end groups in the products of the processes is responsible for their showing an insufficient degree of polymerization and a slow increase in molecular weight during tempering.

Furthermore, complete removal of the catalysts is virtually impossible, so that the chemical and physical behavior of the polymers produced using the catalysts, such as type and quantity of end groups or snap-off behavior during spinning, is adversely affected.

BRIEF SUMMARY OF THE INVENTION

It is an object of the present invention to provide a process for producing polyamides without the disadvantages of the above processes. The process shall provide polyamides in high conversions, and the properties of the polyamides shall not be compromised by the presence of additional components which cannot be separated off.

We have found that this object is achieved by a process for producing polyamides by reacting aminocarboxylic acid compounds of the general formula I

where $R^1$ is OH, O—$C_{1-12}$-alkyl or $NR^2R^3$, where $R^2$ and $R^3$ are independently hydrogen, $C_{1-12}$-alkyl or $C_{5-8}$-cycloalkyl, and m is an integer from 3 to 12, optionally in a mixture with aminonitriles and their hydrolysis products and optionally in the presence of water, in a liquid phase at elevated pressure and elevated temperature in the presence of metal oxides as heterogeneous catalysts, the metal oxides being used in a form which permits mechanical removal from the reaction mixture and being removed from the reaction mixture during or after the polymerization.

In the process, the aminocarboxylic acid compounds or mixtures used may be obtained by complete or incomplete reaction of aminonitriles with water in a preceding stage. The proportion of aminocarboxylic acid compound(s) in the mixture to be polymerized is preferably not less than 75% by weight, particularly preferably not less than 95% by weight.

It was found that the reaction of aminocarboxylic acid compounds or mixtures comprising aminocarboxylic acid compounds and aminonitriles leads to polyamide in a faster and improved manner. The use of homogeneous catalysts which impair the product properties is avoided.

The starting materials used in the process of the invention are aminocarboxylic acid compounds of the general formula I

where $R^1$ is —OH, —O—$C_{1-12}$-alkyl or —$NR^2R^3$, where $R^2$ and $R^3$ are independently hydrogen, $C_{1-12}$-alkyl or $C_{5-8}$-cycloalkyl, and m is 3, 4, 5, 6. 7, 8, 9, 10, 11 or 12, optionally in a mixture with aminonitriles.

Particularly preferred aminocarboxylic acid compounds are those in which $R^1$ is OH, —O—$C_{1-4}$-alkyl such as —O-methyl, —O-ethyl, —O-n-propyl, —O-i-propyl, —O-n-butyl, —O-sec-butyl, —O-tert-butyl and —$NR^2R^3$ such as —$NH_2$, —NHMe, —NHEt, —$NMe_2$ and —$NEt_2$, and m is 5.

Very particular preference is given to 6-aminocaproic acid, methyl 6-aminocaproate, ethyl 6-aminocaproate, 6-amino(N-methyl)caproamide, 6-amino(N,N-dimethyl)-caproamide, 6-amino(N-ethyl)caproamide, 6-amino(N,N-diethyl)-capro-amide and 6-aminocaproamide.

The starting compounds are commercially available or preparable for example as described in EP-A-0 234 295 and Ind. Eng. Chem. Process Des. Dev. 17 (1978)9–16.

The aminonitrile used can be in principle any aminonitrile, i.e., any compound having both at least one amino group and at least one nitrile group. ω-Aminonitriles are preferred, especially ω-aminoalkyl nitriles having from 4 to 12 carbon atoms, more preferably 4 to 9 carbon atoms, in the alkylene moiety, or aminoalkylaryl nitriles having from 8 to 13 carbon atoms, preferred aminoalkylaryl nitriles being those which have an alkyl spacer of at least one carbon atom between the aromatic unit and the amino and nitrile group. Especially preferred aminoalkylaryl nitriles are those which have the amino group and nitrile group in the 1,4 position relative to each other.

The ω-aminoalkyl nitrile used is preferably a linear ω-aminoalkyl nitrile in which the alkylene moiety (—$CH_2$—) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile.

6-Aminocapronitrile is customarily obtained by hydrogenation of adiponitrile according to known methods, described for example in DE-A 836,938, DE-A 848,654 or U.S. Pat. No. 5,151,543. It is also possible to use mixtures of a plurality of aminonitriles.

The catalysts used for heterogeneous catalysis can be known metal oxides, such as zirconium oxide, aluminum oxide, magnesium oxide, cerium oxide, lanthanum oxide and preferably titanium dioxides, as well as beta zeolites and sheet-silicates for heterogeneous catalysis. Particular preference is given to titanium dioxide in the anatase polymorph. It was further found that silica gel, zeolites and doped metal oxides, the dopants being for example ruthenium, copper or fluoride, significantly improve the reaction of the starting materials mentioned. According to the invention, the heterogeneous catalyst has a macroscopic form which permits mechanical removal of the polymer melt from the catalyst, for example by means of sieves or filters. The invention proposes the use of catalyst in extrudate or granule form or in the form of a coating on packings and/or internals.

In another embodiment, the aminocarboxylic acid compounds are reacted with homogeneously dissolved acidic cocatalysts or a mixture of different catalytically active compounds in the presence of the abovementioned heterogeneous catalysts. Preferred cocatalysts for this purpose are acidic catalysts, such as the abovementioned carboxylic acids, terephthalic acid, adipic acid, propionic acid and isophthalic acid, or oxygen-containing phosphorus compounds, especially phosphoric acid, phosphorous acid, hypophosphorous acid, their alkali metal and alkaline earth metal salts and ammonium salts, or oxygen-containing sulphur compounds, especially sulphuric acid and sulphurous acid.

Preference is given to using a Brönsted acid catalyst selected from a beta zeolite catalyst, sheet-silicate catalyst or a titanium dioxide catalyst comprising from 70 to 100% by weight of anatase and from 0 to 30% by weight of rutile in which up to 40% by weight of the titanium dioxide may be replaced by tungsten oxide. The proportion of anatase in the titanium dioxide catalyst should be as high as possible. Preference is given to using a pure anatase catalyst. The catalyst preferably has a pore volume of from 0.1 to 5 ml/g, particularly preferably from 0.2 to 0.5 ml/g. The average pore diameter is preferably within the range from 0.005 to 0.1 $\mu$m, particularly preferably within the range from 0.01 to 0.06 $\mu$m. If highly viscous products are used, the average pore diameter should be large. The cutting hardness is preferably greater than 20 N, particularly preferably >25 N. The BET surface area is preferably more than 40 $m^2/g$, particularly preferably more than 100 $m^2/g$. If the BET surface area is smaller, the bulk volume should be appropriately higher to ensure adequate catalyst activity. Particularly preferred catalysts have the following properties: 100% of anatase; 0.3 ml/g pore volume; 0.02 $\mu$m average pore diameter; 32 N cutting hardness; 116 $m^2/g$ BET surface area or 84% by weight of anatase; 16% by weight of rutile; 0.3 ml/g pore volume; 0.03 $\mu$m average pore diameter; 26 N cutting hardness; 46 $m^2/g$ BET surface area. The catalysts may be prepared from commercial powders as available for example from Degussa, Finnti or Kemira. When tungsten oxide is used, up to 40% by weight, preferably up to 30% by weight, particularly preferably from 15 to 25% by weight of the titanium dioxide is replaced by tungsten oxide. The catalysts can be prepared as described in Ertl, Knözinger, Weitkamp: "Handbook of heterogeneous catalysis", VCH Weinheim, 1997, pages 98ff.

The reaction vessels used are packed with the catalyst material in such a way as to maximize the catalyst surface area available to all volume elements of the reaction solution. If desired, the reaction mixture can be recirculated by pumping to improve the exchange of the reactants at the catalyst surface.

When the reaction mixture is reacted in the presence of a fixed bed catalyst, the temperature of the mixture is preferably within the range from 175 to 350° C., preferably within the range from 200 to 300° C., particularly preferably within the range from 230 to 270° C. The lower limit of the temperature depends also on the degree of polymerization and the water content of the melt, since a liquid-solid phase transition should be avoided. In the absence of a fixed bed catalyst, the temperature of the reaction mixture is within the range from 200 to 350° C., preferably within the range from 220 to 300° C., particularly preferably within the range from 240 to 280° C.

In the process of the invention, the compounds or mixtures mentioned are reacted in the presence of the metal oxide catalysts and optionally with water to form polyamide.

The embodiments of the process are characterized by temperature-time and pressure-time profiles which depend on the reactants and catalysts used. The time dependence of the pressure and temperature depends directly on the progress of the reaction, on the desired molecular weight distribution, or the viscosity of the end product, and on the amount of water to be removed from the reaction mixture.

The number of process stages and the water content of the reaction mixture depend on the composition and especially on the amide and nitrile group content of the reaction mixture. One- and two-stage embodiments are preferred when the reactants contain no amide and nitrile groups or the amide and nitrile group content of the reaction mixture is small and preferably less than 30 mol %, more preferably less than 5 mol %, based on the starting monomers. The one-stage embodiment is particularly preferred for the case when aminocaproic acid alone is to be reacted. If mixtures containing aminonitriles and/or amide groups are reacted, the three- and four-stage embodiments are particularly preferred.

One-stage Procedure

In the one-stage embodiment, the pressure and temperature are preferably adjusted in such a way as to obtain a liquid phase which comprises the reaction mixture and a gaseous phase which can be separated off.

The polycondensation of mixtures preferably having a high aminocaproic acid content, can then be carried out for example similarly to known continuous or batchwise processes which are used for caprolactam polymerization and described in DE-A-44 13 177, DE-A-14 95 198, DE-A-25 58 480, EP-A-0 020 946 and in Polymerization Processes, pages 424 to 467, Interscience, New York, 1977, and in Handbuch der Technischen Polymerchemie, pages 546 to 554, VCH Verlagsgesellschaft, Weinheim, 1993, except that the abovementioned lower reaction temperatures can be used. The water content of the reaction mixture depends in particular on the amide content of the mixture.

When aminoalkanoic acids and especially aminocaproic acid are used exclusively, the reaction of the reactants is preferably carried out without water.

Multistage Procedure

To react a mixture of aminocarboxylic acid compounds and aminonitriles, the inventive embodiments of the process preferably have 2, 3 or 4 stages. The polymerization can be carried out in at least three stages, the first stage being carried out under elevated pressure at which the reaction mixture with the exception of the heterogeneous catalyst is present as a single liquid phase and the last stage being carried out as a postcondensation under a pressure within the range from $0.01 \times 10^5$ to $10 \times 10^5$ Pa, it being possible for the heterogeneous catalyst to be present in either or both of the stages. Particular preference is given to embodiments having 4 stages when amide and/or nitrile groups are present in the reaction mixture.

The invention provides a, preferably continuous, process for producing the polyamide by reacting at least one aminocarboxylic acid compound, optionally in a mixture, comprising the following stages:

(1) reacting the aminocarboxylic acid compounds, optionally in a mixture, at a temperature from 175 to 300° C. and a pressure from 0.1 to $35 \times 10^6$ Pa in a flow pipe which may be packed with a Brönsted acid catalyst selected from a beta zeolite catalyst, sheet-silicate catalyst or a titanium dioxide catalyst comprising from 70 to 100% by weight of anatase and from 0 to 30% by weight of rutile in which up to 40% by weight of the titanium dioxide may be replaced by tungsten oxide to obtain a reaction mixture, (2) further reacting the reaction mixture at a temperature from 150 to 350° C. and a pressure which is lower than the pressure in stage 1 in a reaction which may be carried out in the presence of a Brönsted acid catalyst selected from a beta zeolite catalyst, sheet-silicate catalyst or a titanium dioxide catalyst comprising from 70 to 100% by weight of anatase and 0 to 30% by weight of rutile in which up to 40% by weight of the titanium dioxide may be replaced by tungsten oxide, the temperature and pressure being selected in such a way as to obtain a first gas phase and a first liquid or a first solid phase or a mixture of first solid and first liquid phase, and the first gas phase being separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to 30×10⁶ Pa to obtain a product mixture.

The foregoing process preferably further comprises the following stage:

(4) postcondensing the product mixture at a temperature from 200 to 350° C. and a pressure which is lower than the pressure of stage 3, the temperature and pressure being selected so as to obtain a second, water- and possibly ammonia-comprising gas phase and a second liquid or second solid phase or a mixture of second liquid and second solid phase, which (each) comprise the polyamide.

The process stages correspond to the foregoing stages (1), (2), (3) and (4), a two-stage embodiment of the process combining stages (1) and (4), a three-stage embodiment of the process combining stages (1), (2) and (4) and a four-stage embodiment of the process combining stages (1) to (4).

The above-described processes, i.e., the sequence according to the invention of stages (1) and (4) or (1), (2) and (4) or (1) to (4), can be carried out batchwise, i.e., in succession in a single reactor, or continuously, i.e., simultaneously in successive reactors. It is also possible, of course, to carry out some of stages (1) and (2) continuously and the remainder batchwise.

In a further alternative embodiment of the process for producing polyamides, aminonitriles are reacted with water, completely or incompletely, in a preceding stage and the resulting product mixture is further reacted in the aforementioned stages (1) to (4).

The inventive reaction of aminonitriles with water to form a mixture of aminocaproic acid compounds can be carried out in any desired batchwise or continuous stages. The purpose is to achieve partial hydrolysis with or without polymerization of the nitriles. In a suitable embodiment, the reaction mixture can be admixed with water in a pressure vessel and heated. The molar ratio between aminonitrile and water should be within the range from 1:0.1 to 1:10, preferably within the range from 1:0.5 to 1:6, particularly preferably within the range from 1:1 to 1:4. The temperature during the reaction should be within the range from 150 to 300° C., preferably from 200 to 280° C., particularly preferably within the range from 220 to 270° C. The temperature need not be kept constant during the reaction, but can be ramped, for example.

In a further possible embodiment, the reaction mixture of aminonitriles and a comparatively small amount of water can be admixed with further water at the rate of reaction. This semicontinuous procedure leads to comparatively low autogenous system pressures.

It is further possible for the reaction of the invention to be carried out in a continuous stirred tank under superatmospheric pressure. To this end, the reaction mixture is continuously metered into a stirred tank while at the same time reaction mixture is discharged via a pressure control valve.

All the procedures mentioned can be operated with and without catalyst. If catalysts are used, the above-described Brönsted acid metal oxide catalysts are preferred.

The reaction product obtained is frequently a mixture of polyamide-forming monomers and oligomers, the proportion of which varies as a function of the procedure and the reaction conditions (water content, pressure, temperature). It was found that the hydrolysis of nitrile groups generally proceeds more satisfactorily at high reaction temperatures and with long reaction or residence times.

The reaction mixture of aminonitriles, aminocarboxamides, aminocarboxylic acids and other compounds formed in the preceding stage can then be converted in a multistage process as described above into polyamide. In this reaction, aminocaproic acid compounds or their mixtures are reacted with water in a first stage, partially hydrolytically polymerized and further processed in subsequent reaction stages. The overall process comprises 3 or 4 stages, and it is preferable for the reaction mixture to form a single liquid phase in the first and in the third stage and for a liquid phase comprising water to be added to the third stage.

Furthermore, in the context of the process of the invention, it is also possible to carry out a chain lengthening or branching or a combination thereof. For this purpose, polymer branching or chain-lengthening substances known to a person skilled in the art are added to the reaction mixture. The substances may be added not only to the starting mixture but also to the reaction mixture which is postcondensed. Useful substances (which may also be used as a mixture) are: Trifunctional amines or carboxylic acids as branching agents or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalene-polycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

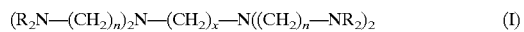

$(R_2N-(CH_2)_n)_2N-(CH_2)_x-N((CH_2)_n-NR_2)_2$ (I)

where

R is H or —(CH$_2$)$_n$—NR$^1{}_2$, where

R$^1$ is H or —(CH$_2$)$_n$—NR$^2{}_2$, where

R$^2$is H or —(CH$_2$)$_n$—NR$^3{}_2$, where

R$^3$is H or —(CH$_2$)$_n$—NH$_2$, n is an integer from 2 to 6, and x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a —(CH$_2$)$_n$—NH$_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanine, naphthalocyanine. Preference is given to 3,5,3',5'-biphenyltetracarboxylic acid, phthalocyanine, naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzene-tricarboxylic acid (trimesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifunctional carboxylic acids, and vice versa.

The substances are present in an amount from 1 to 50 μmol/g of polyamide, preferably from 1 to 35, particularly preferably from 1 to 20, μmol/g of polyamide. The substances are preferably present in an amount from 3 to 150, particularly preferably from 5 to 100, especially from 10 to 70, μmol of equivalents/g of polyamide. The equivalents are based on the number of functional amino groups or carboxylic acid groups.

Difunctional carboxylic acids or difunctional amines are used as chain lengtheners. These have 2 carboxylic acid groups which can be reacted with amino groups, or 2 amino groups which can be reacted with carboxylic acids. The difunctional carboxylic acids or amines, aside from the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as C$_{1-14}$-alkylenediamine, preferably C$_{2-6}$-alkylenediamine, for example hexylenediamine. They can also be cycloaliphatic. Examples are isophoronediamine, dicycycan, laromine. Branched aliphatic diamines are likewise usable, an example being Vestamin TMD (trimethylhexamethylene-diamine, from Hüls AG). They can also be diamines. Entire amines can each be substituted by C$_{1-12}$-alkyl, preferably C$_{1-14}$-alkyl, radicals on the carbon skeleton.

Difunctional carboxylic acids are for example those which form salts with difunctional diamines. They can be linear aliphatic dicarboxylic acids, which are preferably C$_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks are preferably used in amounts from 1 to 55, particularly preferably from 1 to 30, especially from 1 to 15, μmol/g of polyamide.

The starting mixture and the reaction mixture can be admixed in all stages with chain regulators such as aliphatic and aromatic carboxylic and dicarboxylic acids and catalysts such as oxygen-containing phosphorus compounds in amounts within the range from 0.01 to 5% by weight, preferably within the range from 0.2 to 3% by weight, based on the amount of polyamide-forming monomers and aminonitriles used. Suitable chain regulators include for example propionic acid, acetic acid, benzoic acid, terephthalic acid and triacetonediamine.

Additives and fillers such as pigments, dyes and stabilizers are generally added to the reaction mixture prior to pelletization, preferably in the second, third and fourth stage. Particular preference is given to using fillers and additives whenever the reaction or polymer mixture will not encounter fixed bed catalysts in the rest of the processing. One or more impact-modified rubbers may be present in the compositions as additives in amounts from 0 to 40% by weight, preferably from 1 to 30% by weight, based on the entire composition.

It is possible to use, for example, customary impact modifiers which are suitable for polyamides and/or polyarylene ethers.

Rubbers which enhance the toughness of polyamides generally have two essential features: they have an elastomeric portion which has a glass transition temperature of less than –10° C., preferably less than –30° C., and they contain at least one functional group which is capable of interaction with the polyamide. Suitable functional groups include for example carboxylic acid, carboxylic anhydride, carboxylic ester, carboxylic amide, carboxylic imide, amino, hydroxyl, epoxide, urethane and oxazoline groups.

Examples of rubbers which enhance the toughness of the blends include for example:

EP and EPDM rubbers grafted with the above functional groups. Suitable grafting reagents include for example maleic anhydride, itaconic acid, acrylic acid, glycidyl acrylate and glycidyl methacrylate.

These monomers can be grafted onto the polymer in the melt or in solution, in the presence or absence of a free-radical initiator such as cumene hydroperoxide.

The copolymers of α-olefins described under the polymers A, including especially the ethylene copolymers, may also be used as rubbers instead of polymers A and be mixed as such into the compositions of the invention.

A further group of suitable elastomers are core-shell graft rubbers. These are graft rubbers which are produced in emulsion and which have at least one hard and one soft component. A hard component is customarily a polymer having a glass transition temperature of at least 25° C., while a soft component is a polymer having a glass transition temperature of not more than 0° C. These products have a structure made up of a core and at least one shell, the structure being the result of the order in which the monomers are added. The soft components are generally derived from butadiene, isoprene, alkyl acrylates, alkyl methacrylates or siloxanes and optionally further comonomers. Suitable siloxane cores can be prepared for example starting from cyclic oligomeric octamethyltetrasiloxane or tetravinyltetramethyltetrasiloxane. These can be for example reacted with γ-mercaptopropylmethyldimethoxysilane in a ring-opening cationic polymerization, preferably in the presence of sulfonic acids, to form the soft siloxane cores. The siloxanes can also be crosslinked by, for example, conducting the polymerization reaction in the presence of silanes having hydrolyzable groups such as halogen or alkoxy groups such as tetraethoxysilane, methyltrimethoxysilane or phenyltrimethoxysilane. Suitable comonomers here include for example styrene, acrylonitrile and crosslinking or grafting monomers having more than one polymerizable double bond such as diallyl phthalate, divinylbenzene, butanediol diacrylate or triallyl (iso)cyanurate. The hard components are generally derived from styrene, α-methylstyrene and copolymers thereof, preferred comonomers being acrylonitrile, methacrylonitrile and methyl methacrylate.

Preferred core-shell graft rubbers have a soft core and a hard shell or a hard core, a first soft shell and at least one further hard shell. The incorporation of functional groups such as carbonyl, carboxylic acid, acid anhydride, acid amide, acid imide, carboxylic esters, amino, hydroxyl, epoxy, oxazoline, urethane, urea, lactam or halobenzyl groups is here preferably effected by the addition of suitably functionalized monomers during the polymerization of the last shell. Suitable functionalized monomers include for example maleic acid, maleic anhydride, mono- or diesters or maleic acid, tert-butyl (meth)acrylate, acrylic acid, glycidyl (meth)acrylate and vinyloxazoline. The proportion of monomers having functional groups is generally within the range from 0.1 to 25% by weight, preferably within the range from 0.25 to 15% by weight, based on the total weight of the core-shell graft rubber. The weight ratio of soft to hard components is generally within the range from 1:9 to 9:1, preferably within the range from 3:7 to 8:2.

Such rubbers, which enhance the toughness of polyamides, are known per se and described in EP-A-0 208 187 for example.

A further group of suitable impact modifiers are thermoplastic polyester elastomers. Polyester elastomers are segmented copolyetheresters containing long-chain segments, generally derived from poly(alkylene) ether glycols, and short-chain segments, derived from low molecular weight diols and dicarboxylic acids. Such products are known per se and are described in the literature, for example in U.S. Pat. No. 3,651,014. Corresponding products are also commercially available under the names of Hytrel® (Du Pont), Arnitel® (Akzo) and Pelprene® (Toyobo Co. Ltd.).

It will be appreciated that it is also possible to use mixtures of different rubbers. As further additives there may be mentioned for example processing aids, stabilizers and oxidation retardants, agents against thermal decomposition and decomposition by ultraviolet light, lubricating and demoulding agents, flame retardants, dyes and pigments and plasticizers. The proportion thereof is generally up to 40%, preferably up to 15%, by weight, based on the total weight of the composition.

Pigments and dyes are generally present in amounts of up to 4%, preferably from 0.5 to 3.5%, especially from 0.5 to 3%, by weight.

The pigments for coloring thermoplastics are commonly known, see for example R. Gächter and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3$ $Pb(OH)_2$), lithopone, antimony white and titanium dioxide. Of the two most common crystal polymorphs (rule and anatase) of titanium dioxide, the rutile form is preferred for use as white pigment for the molding compositions of the invention.

Black pigments which can be used according to the invention are iron oxide black ($Fe_3O_4$), spinel black (Cu(Cr, Fe)$_2O_4$), manganese black (mixture of manganese dioxide, silicon dioxide and iron oxide), cobalt black and antimony black and also, particularly preferably, carbon black, which is usually used in the form of furnace or gas black (see G. Benzing, Pigmente für Anstrichmittel, Expert-Verlag (1988), p. 78ff).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the abovementioned pigments or dyes in a mixture, for example carbon black with copper phthalocyanines, since this generally facilitates the dispersion of color in the thermoplastic.

Oxidation retardants and thermal stabilizers which can be added to the thermoplastic materials of the invention include for example halides of metals of group I of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferably in a concentration up to 1% by weight, based on the weight of the mixture.

Examples of UV stabilizers are various substituted resorcinols, salicylates, benzotriazoles and benzophenones, which are generally used in amounts of up to 2% by weight.

Lubricating and demoulding agents, which are generally included in the thermoplastic material in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

The substances which are not homogeneously dissolved in the reaction mixture, for example pigments and fillers, are preferably added to the reaction mixture following the production stages which take place in the presence of a fixed bed catalyst.

The polyamides of the invention, especially nylon-6 and copolymers thereof, can be used for producing fibres, films and shaped articles.

According to the invention, the product mixture obtained in stage 3, or the second liquid or second solid phase or the mixture of second liquid and second solid phase (from stage 4) which comprise the polyamide, preferably a polymer melt, is discharged from the reaction vessel by customary methods, for example with the aid of a pump. Subsequently, the polyamide obtained can be worked up in a conventional manner as described in detail for example in DE-A 43 21 683 (page 3 line 54 to page 4 line 3).

DETAILED DESCRIPTION OF THE INVENTION

In a preferred embodiment, the level of cyclic dimer in the nylon-6 obtained according to the invention can be further reduced by extracting the polyamide first with an aqueous solution of caprolactam and then with water and/or subjecting it to a gas phase extraction (described in EP-A-0 284 968, for example). The low molecular weight constituents such as caprolactam and its linear and also cyclic oligomers obtained in the course of this aftertreatment can be returned into the first and/or second and/or third stage.

The examples which follow illustrate the invention.

EXAMPLES

Sample Preparation and Analysis

The so-called relative viscosity (RV), a measure of the molecular weight build-up and the degree of polymerization, was measured in 1% strength by weight solution in the case of extracted material and in 1.1% strength by weight solution in the case of unextracted polymer, in 96% strength sulfuric acid, at 25° C. using an Ubbelohde viscometer. Unextracted polymers were dried under reduced pressure for 20 hours prior to analysis.

The amino and carboxyl end group contents were determined on extracted product by an acidimetric titration. The amino groups were titrated with perchloric acid in 70:30 (parts by weight) phenol/methanol as solvent. The carboxyl end groups were titrated with potassium hydroxide solution in benzyl alcohol as solvent.

For extraction, 100 parts by weight of the polymer mixture were stirred with 400 parts by weight of demineralized water at 100° C., for 32 hours under reflux and, after removal of the water, dried gently, i.e., without postcondensation, at 100° C. under reduced pressure for 20 hours.

The separation of the reaction mixtures into individual substances and analyses of the mass fractions was carried out by means of high pressure liquid chromatography (HPLC). The procedure is described in Anal. Chem. 43, 880 (1971). The products were first dissolved in a mixture of water, sodium borate buffer solution and acetonitrile, derivatized with OPA and then separated with an RP18 HPLC column. The concentrations were correlated via a series of calibrations.

Procedure

The catalyst particles were 100% $TiO_2$ from Finnti, type S150, in the anatase form and had an extrudate length within the range from 2 to 14 mm, an extrudate thickness of about 4 mm and a specific surface area of more than 100 m²/g. The purity of the aminocapronitrile used was 99.5%.

Batchwise Reaction of Aminocarboxylic Acid Compounds

Examples I-1

The runs were carried out in an autoclave with and without (for comparison) a bed of catalyst, the bed completely covering the reaction mixture. After the aminocaproic acid was introduced with and without the catalyst, the autoclave was sealed, vented and repeatedly purged with nitrogen. After the 1.25 hours of heating up to the desired reaction temperature of 230° C. at a pressure of up to 18 bar, manually controlled by means of a valve, the pressure in the autoclave was lowered to ambient pressure (about 1 bar) in the course of 1 hour, so that the prepolymer melt formed was able to postcondense. The product was then extruded in strand form into a water bath.

Example I-2

| Polymer properties* | Relative viscosity | Carboxyl end groups [meq/kg] | Amino end groups [meq/kg] |
|---|---|---|---|
| with catalyst | 2.09 | 112 | 70 |
| without catalyst | 1.80 | 99 | 126 |

*measured on unextracted product

Example I-1 was repeated with a reaction temperature of 250° C.

Result I-2

| Polymer properties* | Relative viscosity | Carboxyl end groups [meq/kg] | Amino end groups [meq/kg] |
|---|---|---|---|
| with catalyst | 1.91 | 105 | 89 |
| without catalyst | 1.69 | 122 | 150 |

*measured on unextracted product

Preliminary Stage for Converting Aminonitriles into Aminocarboxylic Acid Mixtures

Example II-1

In a 2 liter pressure vessel equipped with a heating jacket and anchor stirrer, 1400 g of a reaction mixture consisting of aminocapronitrile and water in a molar ratio of 1:4 were stirred in the sealed reactor at 250° C. The autogenous pressure was 48 bar. After 2 hours the conversion of the aminocapronitrile was 96.6%; the analysis of the reaction mixture is reported in Table II.

Example II-2

In a 2 liter pressure vessel equipped with a heating jacket and anchor stirrer, 1400 g of a reaction mixture consisting of aminocapronitrile and water in a molar ratio of 1:1 were stirred in the sealed reactor at 250° C. The autogenous pressure was 30 bar. After 200 minutes the conversion of the aminocapronitrile was 36%; the analysis of the reaction mixture is reported in Table II.

Example II-3

In a 2 liter pressure vessel equipped with a heating jacket and anchor stirrer, 1400 g of a reaction mixture consisting of aminocapronitrile and water in a molar ratio of 1:4 were stirred in the sealed reactor at 230° C. The autogenous pressure was 39 bar. After 3 hours the conversion of the aminocapronitrile was 96%; the analysis of the reaction mixture is reported in Table II.

Example II-4

In a 2 liter pressure vessel equipped with a heating jacket and anchor stirrer, 1400 g of a reaction mixture consisting of aminocapronitrile and water in a molar ratio of 1:4 were stirred at 250° C. The autogenous pressure was 43 bar. During the reaction time of 3 hours water was continuously introduced into the reactor at a flow rate of 100 g/h. A water/ammonia mixture was likewise continuously removed from the gas phase via an o verflow valve. After 3 hours th e conversion of the aminocapronitrile was >99%; the analysis of the reaction mixture is reported in Table II.

Example II-5

4.5 g of a reaction mixture comprising 2.7 g of aminocapronitrile, 1.8 g of water and 0.5 g of a titanium dioxide catalyst (type P25 from Degussa, coarse powder) were added to a 5.5 ml capacity autoclave. The autoclave was sealed and left at 250° C. in an oil bath for 2 hours. After the reaction, the autoclave was rapidly cooled down and the reaction mixture removed. The aminocapronitrile conversion was about 98%; the analysis of the reaction mixture is reported in Table II.

TABLE II

Results of reaction of aminonitriles in the preliminary stage

| Ex. | Reaction Time [min] | ACN:H₂O | T [° C.] | ACN | di-hexa ACN | ASC | di ASC | tri ACS | ASCA | di ASCA | tri ACSA | CL | di CL | tri CL | higher oligos |
|---|---|---|---|---|---|---|---|---|---|---|---|---|---|---|---|
| II-1 | 120 | 1:4 | 250 | 2.2 | 9.3 | 0.8 | 0.8 | 0.8 | 2.1 | 2.0 | 1.8 | 16.0 | 0.6 | 0.1 | 27.5 |
| II-2 | 120 | 1:1 | 250 | 30.9 | 25.5 | 0.1 | 0.1 | 0.1 | 0.9 | 0.6 | 0.2 | 9.1 | <0.1 | <0.1 | 0 |
| II-3 | 180 | 1:4 | 230 | 2.5 | 10.5 | 0.9 | 0.9 | 0.1 | 1.7 | 1.6 | 1.4 | 23.6 | 0.5 | 0.1 | 20.1 |
| II-4 | 180 | 1:4 | 250 | 0.1 | — | 0.8 | 1.0 | 1.1 | 0.5 | 0.6 | 0.5 | 17.0 | 1.0 | 0.2 | 41.2 |
| II-5 | 120 | 1:4 | 250 | 0.9 | 2.0 | 0.9 | 1.3 | 0.1 | 2.7 | 2.4 | 2.4 | 14.9 | 0.7 | 0.2 | 32.5 |

ACN: aminocapronitrile
ACS: aminocaproic acid
ACSA: aminocaproamide
CL: caprolactam
di-hexa: dimer to hexamer
di: dimer
tri: trimer
oligo: oligomer > 3 units
The components are reported in mass percent based on the total batch.

The aminocarboxylic acid compound mixtures prepared in the preliminary stage were reacted in a four-stage Miniplant. The starting mixtures were pumped with a water content of 50% by weight through the first stage at a flow rate of 600 g/h. The first stage with an empty volume of 1 liter and an internal length of 1000 mm was completely packed with catalyst and was operated at a temperature of 240° C. and a pressure of 55 bar. The second stage used was a 2 liter separating vessel in which the reaction mixture was reacted at a temperature of 250° C. and a pressure of 30 bar. The third stage was a flow pipe 1 l in volume and 1000 mm in length packed with Raschig rings 6 mm in diameter and 6 mm in length (temperature of reaction mixture 250° C., pressure 35 bar), into which water was pumped via a further heated line at a flow rate of 60 g/h. The fourth stage in turn consisted of a separating vessel (volume 2 l, reaction mixture temperature 250° C., pressure 1.2 bar), from which the polymer melt produced was extruded in strand form by means of a gear pump.

Polymers were produced without catalyst for comparison.

TABLE III

Results: Continuous conversion of the aminocarboxylic acid compound mixtures prepared in a preliminary stage as per Examples II-1 to II-5

| Examples | Catalyst | Relative viscosity |
|---|---|---|
| II-1 | with | 2.08 |
| CII-1 | without | 1.40 |
| II-2 | with | 1.97 |
| CII-2 | without | 1.30 |
| II-3 | with | 2.00 |
| CII-3 | without | 1.39 |
| II-4 | with | 2.13 |
| CII-4 | without | 1.62 |

We claim:

1. The process for producing polyamides by reacting aminocarboxylic acid compounds of the general formula I $$H_2N-(CH_2)_m-COR^1 \quad (I)$$

where $R^1$ is OH, O—$C_{1-12}$-alkyl or $NR^2R^3$, where $R^2$ and $R^3$ are independently hydrogen, $C_{1-12}$-alkyl or $C_{5-8}$-cycloalkyl, and m is an integer from 3 to 12, optionally in a mixture with aminonitriles and their hydrolysis products wherein the proportion of aminocarboxylic acid compound(s) in the starting mixture is not less than 75% by weight, and optionally in the presence of water, in a liquid phase at a pressure from 0.1 to 35×10⁶ Pa and a temperature from 175 to 350° C. in the presence of metal oxides as heterogeneous catalysts, the metal oxides being used in a form which permits mechanical removal from the reaction mixture and being removed from the reaction mixture during or after the polymerization.

2. A process of claim 1, wherein the aminocarboxylic acid, is selected from 6-aminocaproic acid, methyl 6-aminocaproate, ethyl 6-aminocaproate, 6-amino(N-methyl)caproamide, 6-amino(N,N-dimethyl)caproamide, 6-amino(N-ethyl)caproamide, 6-aminocaproamide.

3. A process of claim 1, wherein the metal oxide catalysts are used in the form of granules, extrudates, fixed beds or coated packings or internals.

4. A process of claim 1, wherein the metal oxide catalysts are selected form zirconium oxide, aluminum oxide, magnesium oxide, cerium oxide, lanthanun oxide, titanium dioxide, beta-zeolite and sheet-silicates.

5. A process of claim 1, wherein the metal oxide catalysts are used together with acidic cocatalysts homogeneously dissolved in the reaction mixture.

6. A process of claim 1, wherein the polymerization is executed in at least two stages, the first stage being conducted under a pressure from 0.1 to 35×10⁶ Pa at which the reaction mixture with the exception of the heterogeneous catalyst is present as a single liquid phase and the last stage being conducted as a postcondensation under a pressure within the range from 0.01×10⁵ to 10×10⁵ Pa, it being possible for the heterogeneous catalyst to be present in either or both of the stages.

7. A process of claim 1, comprising the following stages:
(1) reacting the aminocarboxylic acid compounds, optionally in a mixture with aminonitriles and their hydrolysis products, wherein the proportion of aminocarboxylic acid compound(s) in the starting mixture is not less than 75% by weight, and optionally in the presence of water at a temperature from 175 to 350° C. and a pressure from 0.1 to 35×10⁶ Pa in a flow pipe optionally packed with a Brönsted acid catalyst selected from a beta zeolite catalyst, sheet-silicate catalyst or a titanium dioxide catalyst comprising from 70 to 100% by weight of anatase and from 0 to 30% by weight of rutile in which up to 40% by weight of the titanium dioxide may be replaced by tungsten oxide to obtain a reaction mixture, (2) further reacting the reaction mixture at a temperature from 150 to 350° C. and a pressure which is lower than the pressure in stage 1 in a reaction optionally carried out in the presence of a Brönsted acid catalyst selected from a beta zeolite catalyst, sheet-silicate catalyst or a titanium dioxide catalyst comprising from 70 to 100% by weight of anatase and 0 to 30% by weight of rutile in which up to 40% by weight of the titanium dioxide is optionally replaced by tungsten oxide, the temperature and pressure being selected in such a way as to obtain a gas phase and a liquid or a solid phase or a mixture of solid and liquid phase, and the gas phase being separated from the liquid or the solid phase or from the mixture of liquid and solid phase, and (3) admixing the liquid or the solid phase or the mixture of liquid and solid phase with a gaseous or liquid phase comprising water at a temperature from 150 to 370° C. and a pressure from 0.1 to 30×10⁶ Pa to obtain a product mixture.

8. A process of claim 7, further comprising the following stage:

(4) postcondensing the product mixture at a temperature from 200 to 350° C. and a pressure which is lower than the pressure of stage 3, the temperature and pressure being selected so as to obtain a water- and possibly ammonia-comprising gas phase and a liquid or solid phase or a mixture of liquid and solid phase, which (each) comprise the polyamide.

9. A multi-stage polymerization process for producing polyamides, wherein the polymerization is carried out in at least two stages, by reacting aminocarboxylic acid compounds of the general formula I $$H_2N-(CH_2)_m-COR^1 \qquad (I)$$

where $R^1$ is OH, O—$C_{1-12}$-alkyl or $NR^2R^3$, where $R^2$ and $R^3$ are independently hydrogen, $C_{1-12}$-alkyl or $C_{5-8}$-cycloalkyl, and m is an integer from 3 to 12, optionally in a mixture with aminonitriles and their hydrolysis products wherein the proportion of aminocarboxylic acid compound(s) in the starting mixture is not less than 75% by weight, and optionally in the presence of water, in a liquid phase at a pressure from 0.1 to 35×10⁶ Pa and a temperature from 175 to 350° C. in the presence of metal oxides as heterogeneous catalysts, the metal oxides being used in a form which permits mechanical removal from the reaction mixture and being removed from the reaction mixture during or after the polymerization, wherein the polymerization is carried out in at least two stages, the first stage being carried out under a pressure from 0.1 to 35×10⁶ Pa at which the reaction mixture with the exception of the heterogeneous catalyst is present as a single liquid phase and the last stage being preferably carried out as a postcondensation under a pressure within the range from 0.01×10⁵ to 10×10⁵ Pa, it being possible for the heterogeneous catalyst to be present in either or both of the stages.

10. A process of any of claim 1, comprising the following stages:

(1) reacting the aminocarboxylic acid compounds, optionally in a mixture, at a temperature from 175 to 350° C. and a pressure from 0.1 to 35×10⁶ Pa in a flow pipe which may be packed with a Brönsted acid catalyst selected from a beta zeolite catalyst, sheet-silicate catalyst or a titanium dioxide catalyst comprising from 70 to 100% by weight of anatase and from 0 to 30% by weight of rutile in which up to 40% by weight of the titanium dioxide is optionally replaced by tungsten oxide to obtain a reaction mixture, (2) further reacting the reaction mixture at a temperature from 150 to 350° C. and a pressure which is lower than the pressure in stage 1 in a reaction which is optionally conducted in the presence of a Brönsted acid catalyst selected from a beta zeolite catalyst, sheet-silicate catalyst or a titanium dioxide catalyst comprising from 70 to 100% by weight of anatase and 0 to 30% by weight of rutile in which up to 40% by weight of the titanium dioxide may be replaced by tungsten oxide, the temperature and pressure being selected in such a way as to obtain a first gas phase and a first liquid or a first solid phase or a mixture of first solid and first liquid phase, and the first gas phase being separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to 30×10⁶ Pa to obtain a product mixture.

11. A process of claim 9, further comprising the following stage:

(4) postcondensing the product mixture at a temperature from 200 to 350° C. and a pressure which is lower than the pressure of stage 3, the temperature and pressure being selected so as to obtain a second, water-and possibly ammonia-comprising gas phase and a second liquid or second solid phase or a mixture of second liquid and second solid phase, which (each) comprise the polyamide.

* * * * *